United States Patent [19]

Hall et al.

[11] Patent Number: 4,700,150

[45] Date of Patent: Oct. 13, 1987

[54] EXTERNAL LASER FREQUENCY STABILIZER

[75] Inventors: John L. Hall, Boulder, Colo.; Theodor W. Hansch, Palo Alto, Calif.

[73] Assignee: Stanford University, Stanford, Calif.

[21] Appl. No.: 745,309

[22] Filed: Jun. 14, 1985

[51] Int. Cl.[4] .............................................. H01S 3/13
[52] U.S. Cl. .................................... 332/751; 372/20; 372/32; 307/425
[58] Field of Search ............... 332/7.51; 350/355, 358; 307/425, 427; 372/18, 20, 29, 32

[56] References Cited

U.S. PATENT DOCUMENTS 4,468,773  8/1984  Seaton ................................. 372/20
4,509,132  4/1985  Kavaya ................................ 372/32

FOREIGN PATENT DOCUMENTS 0061082  5/1980  Japan ................................... 372/32

OTHER PUBLICATIONS

Helmche et al, "Dye Laser . . . Performance", 5/1/82, Appl. Opt., vol. 21, #9, pp. 1686-1694.
Drener et al, "Lase Phase and Frequency . . . Resonator", 6/83, Appl. Phys. B., vol. B 31, #2.
Hall et al, "Optical Heterdyne . . . Spectroscopy", 11/1/81, Appl. Phys. Lett., vol. 39, #9.
Hall et al, "External Dye Laser Frequency Stabilizer", 11/84, Opt. Lett., vol. 9, #11.

*Primary Examiner*—Nelson Moskowitz
*Attorney, Agent, or Firm*—Flehr, Hohbach, Test, Albritton & Herbert

[57] ABSTRACT

An external laser frequency stabilizer combines an acousto-optic frequency shifter and a fast electro-optic phase modulator. A compensating electronic delay line in a crossover network provides a near-ideal transducer response while keeping the voltage across the electro-optic crystal away from the amplifier limits.

5 Claims, 3 Drawing Figures

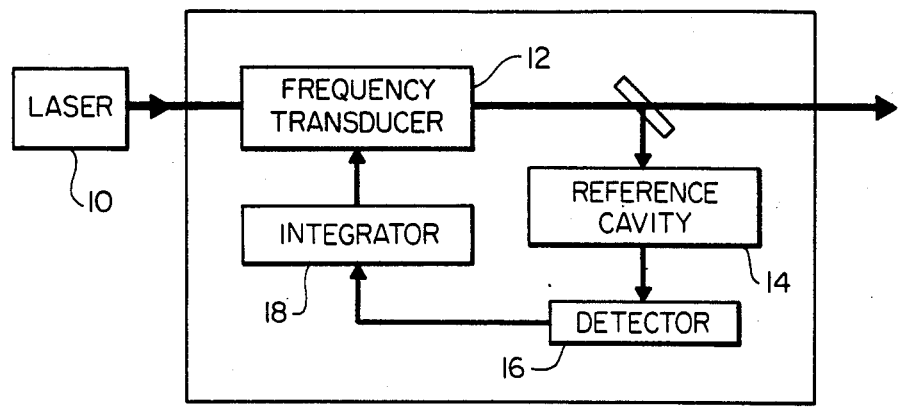
FIG_1
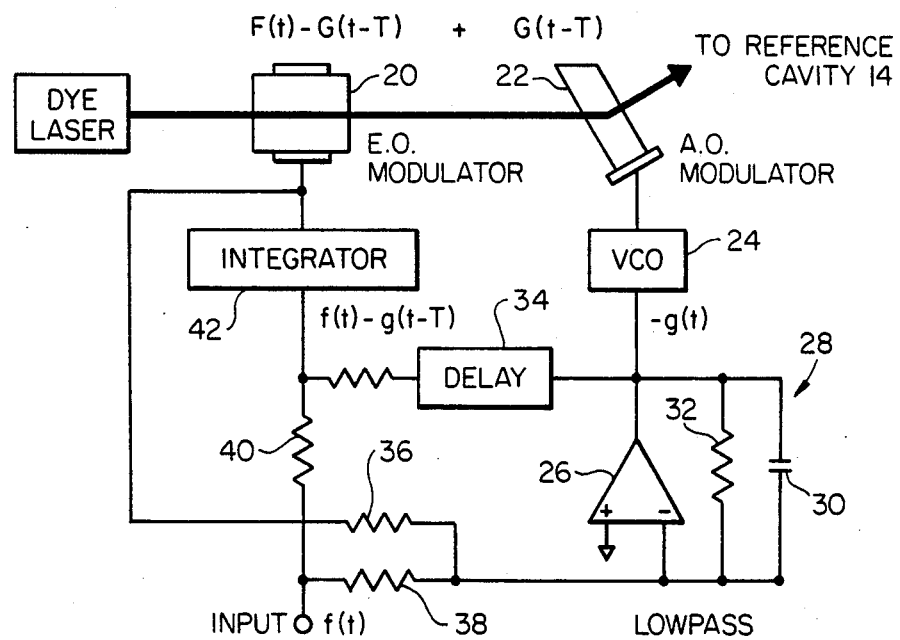
FIG_2

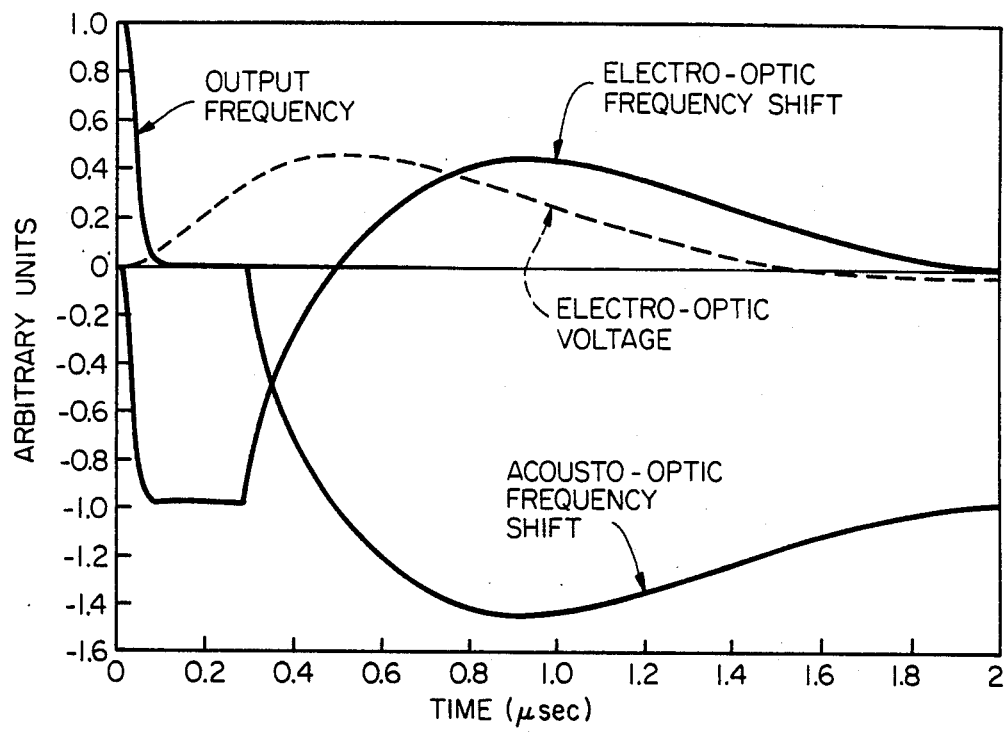
FIG_3

EXTERNAL LASER FREQUENCY STABILIZER

The U.S. Government has rights in the disclosed invention pursuant to NSF Grant PHY-83-08271 and ONR Contract N00014-78-C-0403.

TECHNICAL FIELD

This invention relates to a laser apparatus, and in particular to a laser system wherein frequency stabilization is achieved with external components.

BACKGROUND ART

Tunable lasers are extensively used as fundamental tools in the field of laser spectroscopy. However, problems associated with frequency variations of the laser light arise which tend to degrade the operation of the laser system. For example, dye-lasers, which employ organic media, suffer from variations in the media that result in undesirable frequency shifts and noise. To solve these problems, various means have been proposed for stabilizing the laser frequency.

Although the following description will be directed to the dye-laser for purpose of explanation and example, it should be understood that the invention is not limited thereto.

In a system employing a dye-laser, one technique for achieving frequency stabilization is to tune the dye-laser frequency relative to a fixed reference cavity by using piezo transducers to change the cavity lens mechanically. Nevertheless, the response of such a system is not sufficient to compensate for rapid phase fluctuations, such as one rad per microsecond, which is generated by a typical dye jet.

External laser frequency stabilization has been demonstrated and implemented in prior art apparatus. In one approach, frequency fluctuations are corrected by means of an external transducer after the radiation or light has left the laser. The corrected frequency is monitored by a passive reference cavity, and an amplified and integrated error signal is fed back to a frequency transducer. In such prior art apparatus, an acoustooptic modulator Doppler shifts the frequency of the laser beam by reflecting it off a traveling acoustic compression wave. The shift in the first diffraction order simply equals the frequency of the acoustic wave. However, acousto-optic modulators have an unavoidable time delay, of the order of a microsecond, which limits the possible bandwidth of the servo loop, and thus also limits the low frequency gain that is realized without stability problems. Whereas such a delayed response has been found sufficient for frequency stabilization of an argon-ion laser, it is not fast enough to compensate effectively for rapid phase fluctuations that are encountered in a typical cw dye laser.

In a dye-laser, thickness variations of the dye jet as small as a few molecular monolayers introduce phase shifts of several radians during the time the dye travels through the beam waist, which may be approximately 3 microseconds. Variations in beam diameter change the light path in the reference cavity leading to detection error. Frequency stabilizers capable of compensating for such rapid fluctuations generally rely on the rapid response of an electro-optic phase modulator inside the laser resonator. However, installation of a modulator inside the cavity of a commercial dye-laser requires difficult optical and mechanical modifications, and tends to lead to a substantial reduction in power, as a lossy transducer is inserted at a location of high light intensity.

SUMMARY OF THE INVENTION

An object of this invention is to provide an improved laser system which is frequency stabilized.

Another object of this invention is to provide a fast frequency transducer that realizes frequency stabilization or modulation in a rapid, simple and effective manner.

In accordance with this invention, a laser apparatus employs a fast frequency transducer which serves as an external frequency stabilizer. The frequency transducer incorporates an acousto-optic frequency shifter and an electro-optic phase modulator. A compensating electronic delay line ensures that the acousto-optic frequency shifter relieves the electro-optic modulator as quickly as possible after a perturbation, thereby keeping the voltage at the crystal of the electro-optic modulator away from its limits. At the same time, the frequency transducer maintains close to an ideal fast response, thus producing a net frequency shift proportional to the input voltage signal. By means of the frequency transducer of this invention, an improved frequency servo system using a simple feedback loop is provided in which the gain drops toward high frequencies at a desired rate, for example 9 dB per octave.

BRIEF DESCRIPTION OF THE DRAWINGS

The invention will be described in greater detail with reference to the drawings in which:

FIG. 1 is a block diagram of the novel frequency stabilizer system, in accordance with this invention;

FIG. 2 is a block and schematic diagram of the frequency transducer depicted in FIG. 1; and FIG. 3 is a series of curves illustrating the dynamic response of a stabilizing system employing the frequency transducer of this invention.

DESCRIPTION OF THE PREFERRED EMBODIMENT

With reference to FIG. 1, a laser apparatus incorporating an external frequency stabilizer includes a laser 10 which directs its radiation to a frequency transducer 12, that serves to provide frequency stabilization, in accordance with this invention. The frequency stabilized signal is directed to a passive optical cavity 14 that provides a reference frequency to which the frequency of the laser beam is locked. An error signal is produced representing the difference between the reference frequency and the frequency of the laser beam. The error signal is detected by detector 16, consisting of photodiodes that monitor the output of the reference cavity. The output of the detector is provided to an integrator 18, which operates at a rate of 9 decibels per octave, by way of example, and serves to prevent oscillations and to stabilize the light frequency. The integrated signal is fed back to the frequency transducer to form a closed servo loop, whereby the fast frequency transducer provides rapid shifts in phase of the light beam and stabilizes the frequency of the laser radiation. By this means, variations of frequency within the system are cancelled by the provision of the rapid frequency shift so that the system is effectively balanced. In an implementation of a laser apparatus employing the stabilizing rapid frequency illustrated herein, a unity gain greater than 1.5 MHz was realized.

With reference to FIG. 2, the novel fast frequency transducer 12 of this invention incorporates an electro-optic (E.O.) phase modulator 20 which receives the laser beam from dye-laser 10 and changes the phase of the light in response to the voltage received from a fast integrator 42. The frequency at the E.O. modulator is unduly shifted by $\Delta v$ due to noise and other undesirable effects and requires correction, as implemented by the present invention. The frequency shifted laser beam is transmitted from the E.O. phase modulator 20 to an acousto-optic (A.O.) modulator 22 which shifts the light frequency by means of an acoustic compression wave that reflects light. The reflected light is directed to the reference cavity 14, and an error signal is generated as described with respect to FIG. 1.

In operation, the A.O. modulator 22 is driven by a voltage controlled oscillator (VCO) 24 having a center frequency $v_0'$ and excursion frequency $\Delta v'$ proportional to the input voltage signal $V'(t)$ at the VCO input. Because of the propagation time T of the acoustic wave, the A.O. modulator 22 produces a delayed frequency shift $v_0'$ plus $\Delta v'(t-T)$ of the light beam. Normally the acoustic wave is relatively slow. In accordance with this invention, the signal that is applied to the VCO input is concurrently sent through an electronic delay line 34 and added to the input of the fast integrator 42, so that the electro-optic crystal produces an additional frequency shift $-\Delta v'(t-T)$. The electronic delay line is matched to the A.O. modulator for optimum operation. As a result, the variable part of the acousto-optic shift is cancelled. The net frequency shift is then $v' + \Delta v$, independent of $\Delta v'$. To balance the system, the time delay of the acousto-optic interaction is matched to the selected delay of the electronic delay line. The acousto-optic frequency shift $\Delta v'$ is set independently to minimize the voltage across the E.O. modulator without affecting the net frequency shift of the frequency transducer.

The VCO input voltage $V'$ is produced by an inverting amplifier 26 having unity gain and a low pass filter 28 consisting of a capacitor 30 and resistor 32. The amplifier and filter receive the input signal V combined with a feedback signal proportional to the voltage applied to the electro-optic modulator crystal. The feedback signal from the output of integrator 42 and the input voltage obtained from the integrator 18 are combined and directed through a resistive network consisting of parallel connected resistors 36 and 38, and through the amplifier 26 and low pass filter 28. The voltage output of the integrator 42 is passed from the amplifier and filter to the VCO 24 and A.O. modulator 22 to shift the light frequency. As a result, the voltage at the E.O. modulator 20 is limited whereby the E.O. modulator crystal will not spark or burn out due to excessive voltage.

The gain of the inverter 26 is adjusted so that its output cancels the input signal V at the integrator 42 in steady state. The feedback signal is also passed from the inverting amplifier 26 and filter 28 to the delay 34, and the feedback loop serves to provide an instantaneous frequency shift of the light beam which corrects undesirable frequency fluctuations. The feedback signal which is proportional to the voltage at the electro-optic crystal is increased to minimize the recovery time until the crystal voltage shows signs of ringing after a step perturbation.

With respect to FIG. 3, the dynamic response of a frequency transducer, such as employed in the instant invention, is illustrated as predicted by a numerical simulation. The assumption is made that the input frequency jumps by +1 unit at time t=0. The electro-optic modulator works almost immediately to correct the output frequency for the perturbation, while the crystal voltage increases linearly. The acousto-optic modulator then quickly takes over to allow the electro-optic crystal work in reverse direction until the crystal voltage has returned to zero.

In a successful implementation of this invention, an E.O. modulator with a Brewster-cut transverse AD*P crystal ($C \cong 80pF$) was used, and a retardation of 2 nanometers per volt was attained when used in a triple pass. The modulator was driven directly by an integrating and inverting high voltage operational amplifier with a maximum slew rate of 200 Volts per microsecond and a maximum excursion of ±150 Volts. Using a 15×preamplifier and a passive integrator, the system provided an electro-optic frequency shift of 2 megaHertz per volt for small signals. The A.O. modulator used $TeO_2$, and operated at a center frequency of 120 MHz with a modulation bandwidth of 25 MHz. At an rf input power of 1 Watt, a light deflection efficiency of up to 85% was realized. At a beam diameter of 90 $\mu$m, the pulse response was as short as 15 nanoseconds. An acoustic delay time of 300 nsec was realized by directing the light beam close to the acoustic transducer. The VCO was operated at 60 MHz, and after frequency doubling its sensitivity was set to be 2 MHz/V to match the response of the E.O. transducer.

The compensating delay line was constructed of a chain of 15 LC filters and had an impedance of about 820 ohms. The delay line provided a time delay of 300 nsec, as indicated above. The low pass inverter circuit feeding the delay line and the VCO provided unity dc gain and a 100 nsec time constant.

By virtue of the novel frequency transducer employing, in combination, a fast E.O. modulator, an A.O. modulator and an electronic delay line, frequency stabilization of a laser apparatus is effectively accomplished. The frequency transducer is particularly applicable to a self-contained external frequency stabilizer for use with a laser apparatus without introducing lossy transducer elements within the laser cavity. In addition, the frequency transducer of this invention may be employed as a modulator, in an optical communications system by way of example.

It should be understood that the scope of the invention is not limited to the specific parameters set forth above. For example, analog delay means that provide the desired delay may be used instead of the LC filter chain. Also, the A.O. modulator may utilize lead molybdate instead of tellurium oxide. Also it should be noted that a plurality of modulators or stabilizers can be used in cascade, if so desired, in accordance with this invention.

What is claimed is:
1. A frequency transducer for controlling or modulating the frequency of a light radiation system comprising:
   a source of radiation having a predetermined frequency;
   an electro-optic phase modulator for receiving said radiation and for changing the phase of said radiation in proportion to an applied error voltage;
   an acousto-optic modulator coupled to said electro-optic modulator for shifting the frequency of the output signal of said electro-optic modulator;

a signal source for providing an error voltage representing undesirable fluctuations in the frequency of said light radiation;

a first channel including a fast integrator coupled between said signal source and the input circuit of said electro-optic modulator;

a second channel including a voltage controlled oscillator coupled between said signal source and said acousto-optic modulator; and a network including an electronic delay circuit coupled between said first and second channels for matching the delay of the acousto-optic modulator.

2. A frequency transducer as in claim 1, wherein said network further includes an inverting amplifier and a low pass filter connected in parallel and coupled to said delay circuit and to the input circuit of said voltage controlled oscillator.

3. A frequency transducer as in claim 2, wherein said delay circuit is coupled in a closed feedback loop to the input circuit and output circuit of said fast integrator.

4. A frequency transducer as in claim 1, wherein said delay circuit comprises analog delay means.

5. A frequency transducer as in claim 1, wherein said acousto-optic modulator utilizes tellurium dioxide, or lead molybdate.

* * * * *